United States Patent
Osborne et al.

(10) Patent No.: US 8,038,100 B2
(45) Date of Patent: Oct. 18, 2011

(54) PANELED PARTITION WITH TRACK FOR LINEAR AND ROTATIONAL MOVEMENT

(75) Inventors: Chris Osborne, Efland, NC (US); Michael Tsay, Irvine, CA (US)

(73) Assignee: Honda Motor Co., Ltd., Tokyo (JP)

( * ) Notice: Subject to any disclaimer, the term of this patent is extended or adjusted under 35 U.S.C. 154(b) by 697 days.

(21) Appl. No.: 12/137,138

(22) Filed: Jun. 11, 2008

(65) Prior Publication Data
US 2009/0078824 A1    Mar. 26, 2009

Related U.S. Application Data

(63) Continuation-in-part of application No. 29/295,079, filed on Sep. 21, 2007, now Pat. No. Des. 586,474.

(51) Int. Cl.
*B64C 1/14* (2006.01)
(52) U.S. Cl. ..................................... 244/129.5
(58) Field of Classification Search ............... 244/118.5, 244/129.5; 49/226, 232, 246, 208, 366, 372, 49/62, 370, 410, 177; 130/118, 201, 202, 130/33, 37
See application file for complete search history.

(56) References Cited

U.S. PATENT DOCUMENTS

| | | | | |
|---|---|---|---|---|
| 2,926,037 A * | 2/1960 | Granzow | ...................... | 292/113 |
| 3,212,803 A * | 10/1965 | Russell et al. | ................ | 292/107 |
| D220,873 S | 6/1971 | Kelly et al. | | |
| 4,380,836 A | 4/1983 | Braxton | | |
| D288,718 S | 3/1987 | Juaire et al. | | |
| 4,911,219 A * | 3/1990 | Dalrymple | ..................... | 160/118 |
| 5,093,941 A | 3/1992 | Muller | | |
| 5,398,465 A | 3/1995 | Tagg | | |
| 5,544,449 A * | 8/1996 | Amelio et al. | ............. | 244/129.5 |
| 6,186,444 B1 * | 2/2001 | Steel | .......................... | 244/129.5 |
| 6,659,401 B1 * | 12/2003 | Semprini | .................. | 244/129.5 |

OTHER PUBLICATIONS

U.S. Application No. 29/295,079, filed on Sep. 21, 2007.
Notice of Allowance from U.S. Application No. 29/295,079 mailed Oct. 30, 2008.

* cited by examiner

*Primary Examiner* — Galen Barefoot
(74) *Attorney, Agent, or Firm* — Plumsea Law Group, LLC; Mark E. Duell

(57) ABSTRACT

A paneled partition assembly is designed to close an opening and collapses to uncover the opening by a movement of at least one panel that initiates the rotation and translation of at least one other panel. When the paneled partition assembly is in a closed or extended position, the plurality of panels covers the opening regardless of the opening's shape, size, or irregularity. When the paneled partition assembly is in an open or retracted position, the plurality of panels collapse to a smaller configuration. In moving between the extended and retracted positions, the panels rotate and translate fluidly with minimum user interaction.

18 Claims, 14 Drawing Sheets

PANELED PARTITION WITH TRACK FOR LINEAR AND ROTATIONAL MOVEMENT

CROSS REFERENCE TO RELATED APPLICATIONS

This application is a continuation in part of U.S. application Ser. No. 29/295,079, entitled "Lavatory Door", and filed on Sep. 21, 2007 now U.S. Pat. No. D. 586,474, which patent application is hereby incorporated by reference in its entirety.

BACKGROUND OF THE INVENTION

1. Field of the Invention

The present invention relates to a paneled partition, and more particularly to a paneled partition that extends to close an opening and collapses to uncover the opening by the movement of at least one panel that initiates the rotation and translation of at least one other panel.

2. Description of Related Art

Partitions are used in a variety of environments to provide separation between indoor spaces and between indoor and outdoor spaces. Examples of partitions include doors, windows, cubicles, hanging walls, accordion walls, etc. Partitions may be configured to be installed in buildings, other structures, or vehicles, such as airplanes, boats, trains, buses, and cars.

Often, partitions are opened by rotating the partition at least ninety degrees into a room to allow individuals to see and walk through the resulting opening into another space. For example, hinged doors and hinged window shutters often function in this manner.

Some partitions are opened by sliding a multi-paneled partition so that it folds one panel against another. In order to open and close such a partition, it must extend into the space. These partitions can also be cumbersome to maneuver if the folded area does not automatically actuate and the individual must press the panels slightly to force the panels to fold. Such partitions are often described as accordion-type because they move like an accordion. Accordion-type partitions that include only two panels are often called bifolds.

Accordion-type or hinged partitions require open space in the immediate vicinity of the partition so that the partition can be swung or folded open and closed. Such space requirements are not always feasible in small spaces like vehicles or small buildings. Such designs may also be cumbersome for someone with mobility issues, such as a wheelchair bound individual, to maneuver themselves clear of the partition and open the partition simultaneously. In other words, hinged partitions may cause accessibility issues.

Other partitions are opened by sliding one or more panels in parallel relation to a wall. These are particularly useful when the partition is large and therefore impractical for a hinge to hold. The design allows for increased flexibility in the size of the opening. If a recess is provided for the partition, this type of door is typically called a pocket door. Airplane window shades function in a similar manner. Airplane window shades often slide into and out of a recess to alternately cover or uncover the window of the airplane cabin.

A pocket-type design is advantageous in areas where there is little room on either side of a wall for a partition to protrude. However, this design generally does not optimize the interior wall space used. First, a frame is typically needed in the wall to support the mechanism. Second, the partition generally slides straight into the recess. As a result, the height and width of the recess is equal to or larger than the height and width of the partition. Additionally, the entire area of the recess should be clear of plumbing, electrical wiring, or other internal features. The amount of clearance required may not be feasible in smaller spaces.

Other designs include combinations of the previously mentioned types. For example, some cabinet doors swing outward and then rotate laterally using several hinges. As a final step, they slide backwards into a recess within the cabinet or into a space adjacent to the cabinet. This design includes both the advantages and disadvantages of the hinged and pocket designs.

While the art has addressed issues related to ease of use and space saving, additional space saving designs are needed. These new designs should also be easy to use. Therefore, there is a need in the art for a system that addresses the shortcomings of the prior art discussed above.

SUMMARY OF THE INVENTION

A paneled partition is disclosed. The paneled partition assembly is used to selectively separate a first space from a second space. The paneled partition assembly extends to close an opening and collapses to uncover the opening by the movement of at least one panel that initiates the rotation and translation of at least one other panel. When the paneled partition assembly is in a closed or extended position, the plurality of panels can cover the opening regardless of the opening's shape, size, or irregularity. When the paneled partition assembly is in an open or retracted position, the plurality of panels collapse to minimize space requirements. In moving between the extended and retracted positions, the panels rotate and translate fluidly with minimum user interaction.

In one aspect, the partition assembly comprises a wall portion defining an opening and a plurality of panels. The plurality of panels are arranged in communication with the wall portion and each other to selectively cover the opening when the plurality of panels are in a fully extended position and to uncover the opening when the plurality of panels are in a retracted position. The plurality of panels comprise at least one driving panel and at least one following panel coupled such that movement of the at least one driving panel causes movement of the at least one following panel. The at least one driving panel moves linearly to cause the at least one following panel to move linearly and rotationally.

In another aspect, a track system associates the plurality of panels with the wall portion and with each other. The plurality of panels are moved between the fully extended position and the retracted position using the track system. The track system guides linear motion of the at least one driving panel and linear motion of the at least one following panel.

In another aspect, a locking mechanism locks the at least one driving panel in the fully extended position.

In yet another aspect, the partition assembly is used in an airplane where a cabin wall portion defines an opening and includes a plurality of panels. The plurality of panels are arranged in communication with the cabin wall portion and each other to selectively cover the opening when the plurality of panels are in a fully extended position and to uncover the opening when the plurality of panels are in a retracted position. The plurality of panels comprise at least one driving panel and at least one following panel coupled such that movement of the at least one driving panel causes movement of the at least one following panel. The at least one driving panel moves linearly to cause the at least one following panel to move linearly and rotationally.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
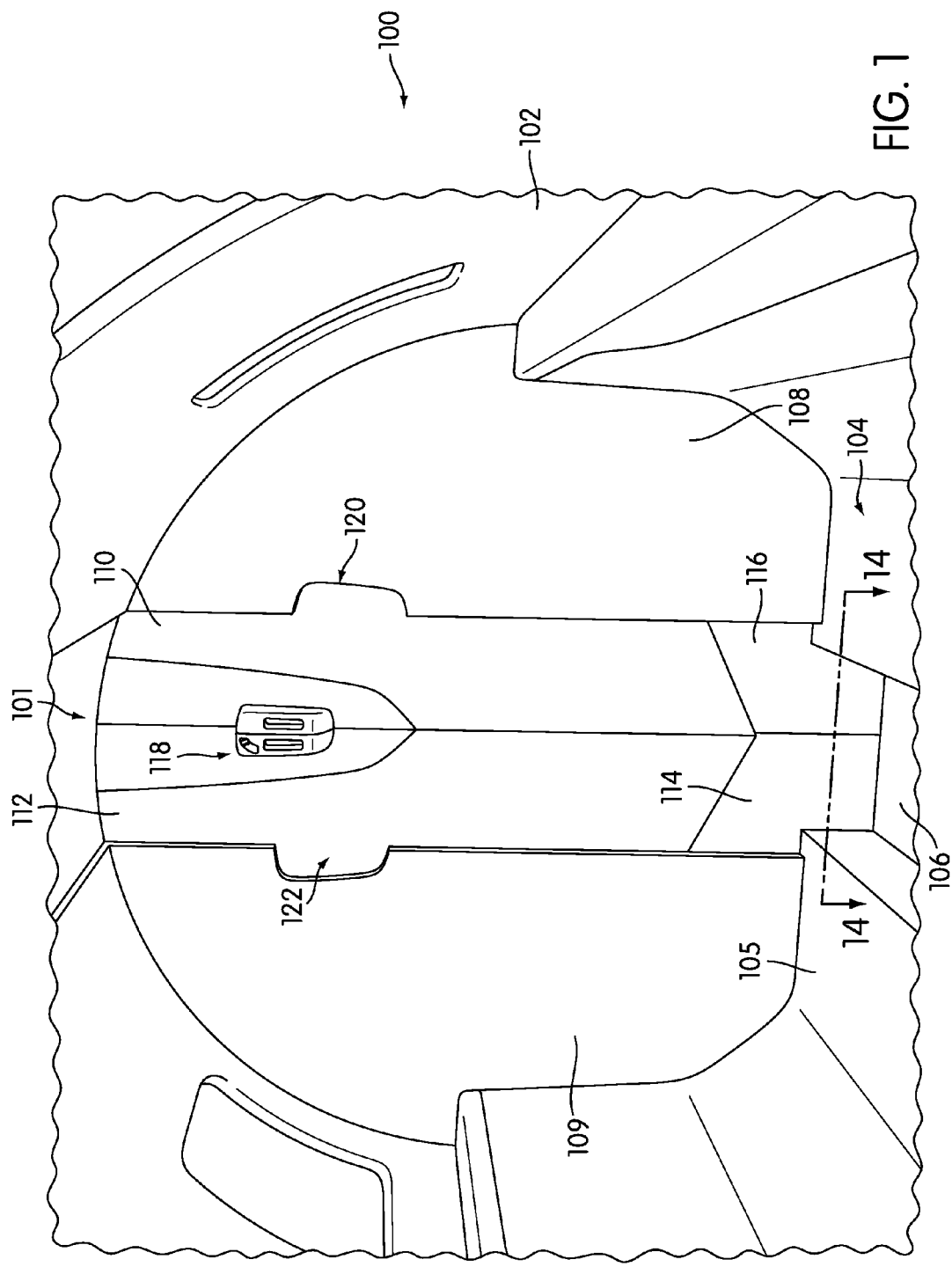
FIG. 1 is a schematic environmental diagram of an exemplary embodiment of a paneled partition assembly in a vehicle.

Embodiments of the present invention include a paneled partition assembly that extends to close an opening and collapses to uncover the opening by the movement of at least one panel that initiates the rotation and translation of at least one other panel. When the paneled partition assembly is in a closed or extended position, the panels can cover the opening regardless of the opening's shape, size, or irregularity. When the paneled partition assembly is in an open or retracted position, the panels collapse to minimize space requirements. In moving between the extended and retracted positions, the panels rotate and translate fluidly with minimum user interaction. Therefore, the paneled partition assembly is user friendly and ideal in areas where space is limited.

With respect to FIGS. 1-14, various features may be referred to using directional adjectives such as top, bottom, right, left, up, down, etc. These descriptions referring to the orientation of the device as illustrated in the drawings are for convenience and clarity, and should not be interpreted as limiting the scope of the invention in any way. It is understood that directional adjectives will change if the vehicle was viewed from a different orientation than as pictured.

To clearly understand the invention, it is first described using FIGS. 1-8 that illustrate the paneled partition in an exemplary environment and in operation. Then the invention is described using FIGS. 2 and 9-14 to illustrate the paneled partition and lock in more detail.

Partitions may be configured to fit in vehicles, buildings, or other structures. FIG. 1 is a schematic environmental diagram of an exemplary embodiment of a paneled partition assembly in a vehicle. Any type of vehicle may be equipped with this paneled partition, and in the illustrated embodiment, the vehicle is an airplane. Referring to FIG. 1, airplane interior 100 is defined by fuselage 102. The compartment illustrated in FIG. 1 may be used as a seating area. Seats may be positioned and attached to top flat portions of right and left seating area platforms 104, 105. Seats are not illustrated in airplane interior 100 so that paneled partition assembly 101 is more easily viewed. Aisle 106 separates right and left seating area platforms 104, 105. The floor of aisle 106 is positioned lower than right and left seating area platforms 104, 105 so that passengers and crew have more headroom for maneuverability. Although the lowered aisle floor offers maneuverability advantages, it also adds design challenges with respect to separating the seating area from other cabin compartments.

To separate one airplane compartment from another compartment, a partition or partition assembly may be used. As shown in the figures, the seating area is separated from another compartment by paneled partition assembly 101 that includes a cabin wall. The cabin wall is comprised of front wall portions 108, 109 and corresponding rear wall portions. A recess is provided between each front wall portion and corresponding rear wall portion. Paneled partition assembly 101 further comprises four upper panels and a pair of lower panels. In this embodiment, the upper panels are the driving panels and the lower panels are the following panels. The upper panels comprise front driving panel portions 110, 112 and corresponding rear driving panel portions. The lower panels comprise follower panel portions 114, 116 that are sandwiched between the front driving panel portions and the rear driving panel portions.

Another way to view the panels is in terms of a pair of upper panels cooperating with a pair of lower panels. The upper panels have a dual thickness so as to provide a receiving recess along a lower portion into which the lower panels retract. The lower panels are received into the upper panels thereby visually dividing them in half. Hence, the resulting description "upper front and upper rear panel portions." It is also contemplated that the upper panels could each be solid panels with a recess or pocket disposed along the upper panel's lower edge into which the lower panel is received. In the illustrated embodiment, the upper panels are the driving panels and the lower panels are the following panels. It is of course possible, and may in some applications be desirable to configure the assembly so that the operative relationship is reversed. For example, in an application in which a user's foot actuates the partition, the lower panels could be driving panels.

A locking mechanism or lock 118 is located on the driving panels to maintain paneled partition assembly in an extended or closed position. When lock 118 is unlocked, the driving and follower panels can move into a retracted position. In the retracted position, the driving and following panels reside within the aforementioned cabin wall recesses. In the illustrated embodiment, the driving and follower panels are guided between the extended and retracted positions by numerous tracks and track heads arranged on the cabin walls, driving panels, and follower panels. Front driving panel portions 110, 112 are guided by driving track heads 146, 148, 170, 172 and driving tracks 142, 144, 166, 168. The driving track heads are positioned on the driving panel portions and the driving tracks are positioned on front wall portions 108, 109. The tracks and track heads allow driving panel portions 110, 112 to move linearly. The corresponding rear driving panel portions are guided by similarly positioned track heads and tracks positioned on the rear driving panels and rear wall portions.

Following panel portions 114, 116 are guided by following track heads 147, 149, 163, 165 and connecting track heads 177, 185 that are positioned on the following panel portions. The following panel portions are also guided by follower tracks 143, 145, 159, 161 that are positioned in the front wall portions and connecting tracks 175, 183 that are positioned in the driving panel portions. The following and connecting tracks and track heads allow following panel portions 114, 116 to move linearly and rotationally.

In moving to a retracted position, the diagonally downward motion of the driving panel portions applies a force on the follower panel portions through connecting track heads 177, 185 and connecting tracks 175, 183. The applied force causes the diagonally upward and rotational motion of the follower panel portions. In moving back to the extended position, the driver panel portions are moved in reverse to cause the follower panels to move in reverse.

Figure 2:
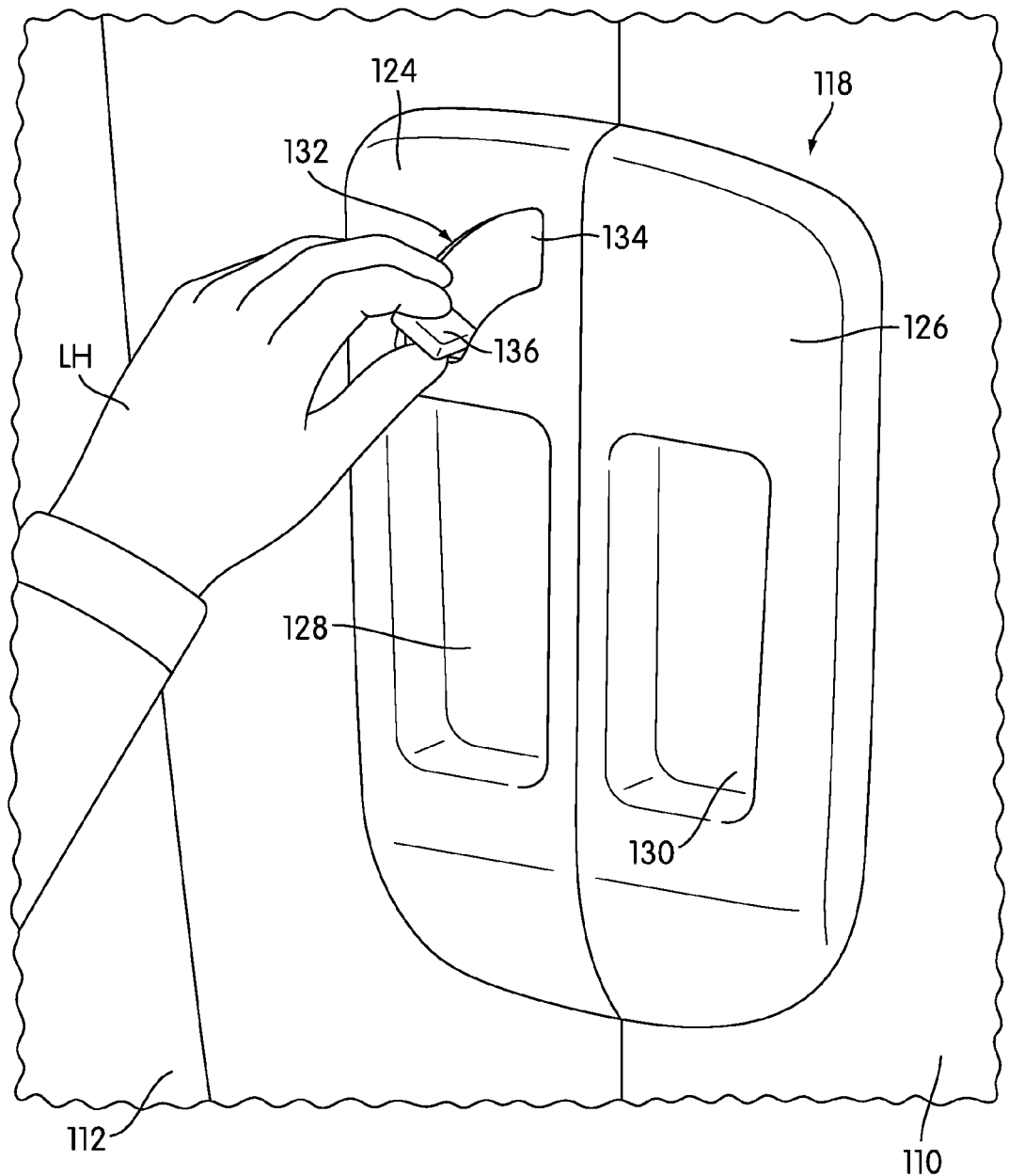
FIG. 2 is a schematic isometric view of an embodiment of a paneled partition assembly locking mechanism.

FIGS. 2-8 illustrate how paneled partition assembly 101 moves between an extended, that is, closed position and a retracted or open position. To move from an extended position to a retracted position, lock 118 is first unlocked. FIG. 2 is a schematic isometric view of an embodiment of a paneled partition assembly locking mechanism. Referring to FIG. 2, lock 118, on a front side, comprises a front left cover 124 and a right front cover 126. Left cover 124 includes a locking tab 136 and a locking slot 132. Operated from this front side, a user's left hand LH moves locking tab 136 through locking slot 132 from locking slot first end 121 to locking slot second end 123. Unlocking lock 118 disengages driving panel portion 112 and left cover 124 from driving panel portion 110 and right cover 126.

Paneled partition assembly 101 is configured to move between the extended and retracted positions with minimum user interaction. The movement of the panels are also assisted by a series of tracks and track heads that may vary in number.

Figure 3:
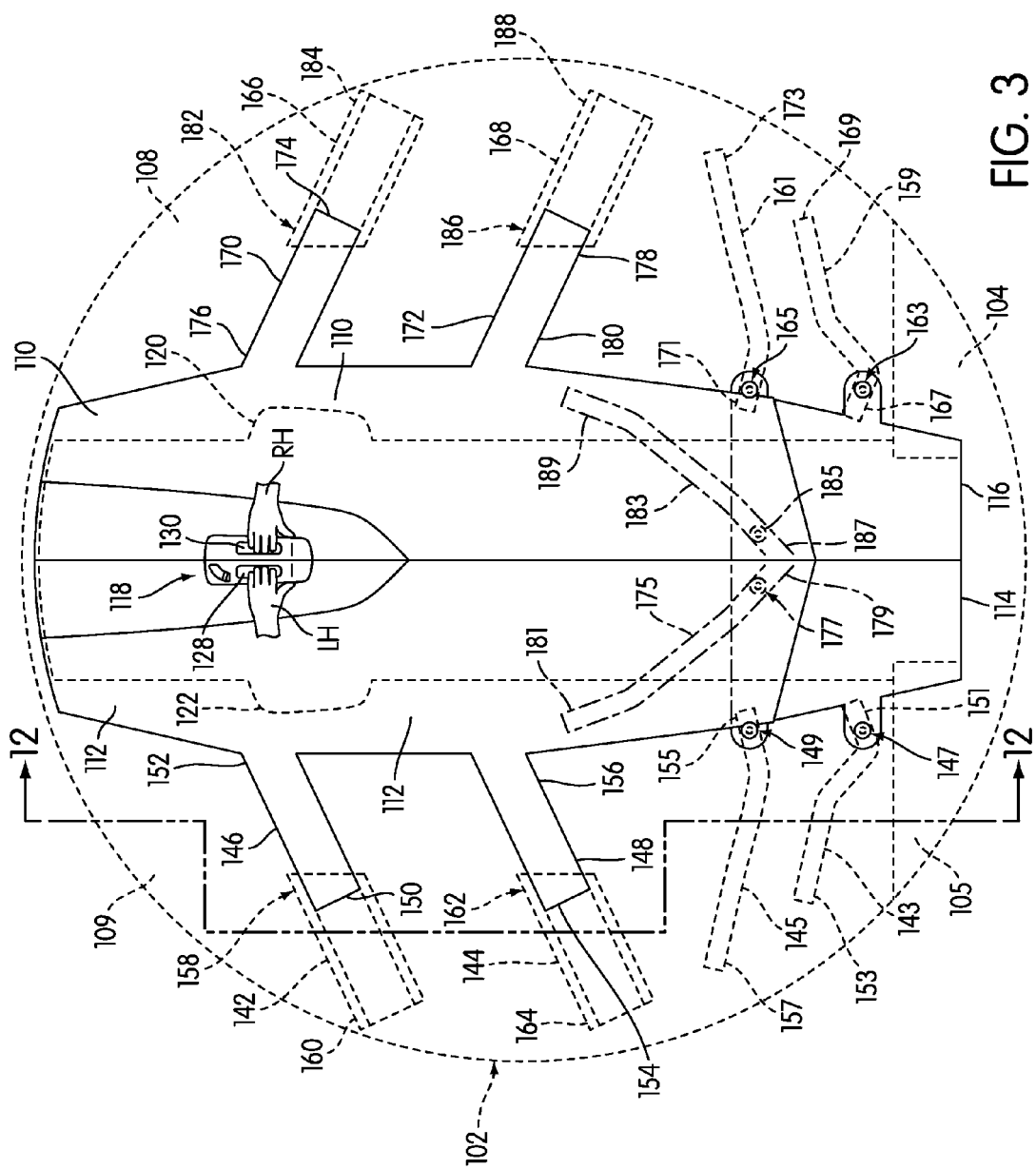
FIG. 3 is a schematic elevational view of the paneled partition assembly of FIG. 1 shown in both an extended and an unlocked position.
Figure 4:
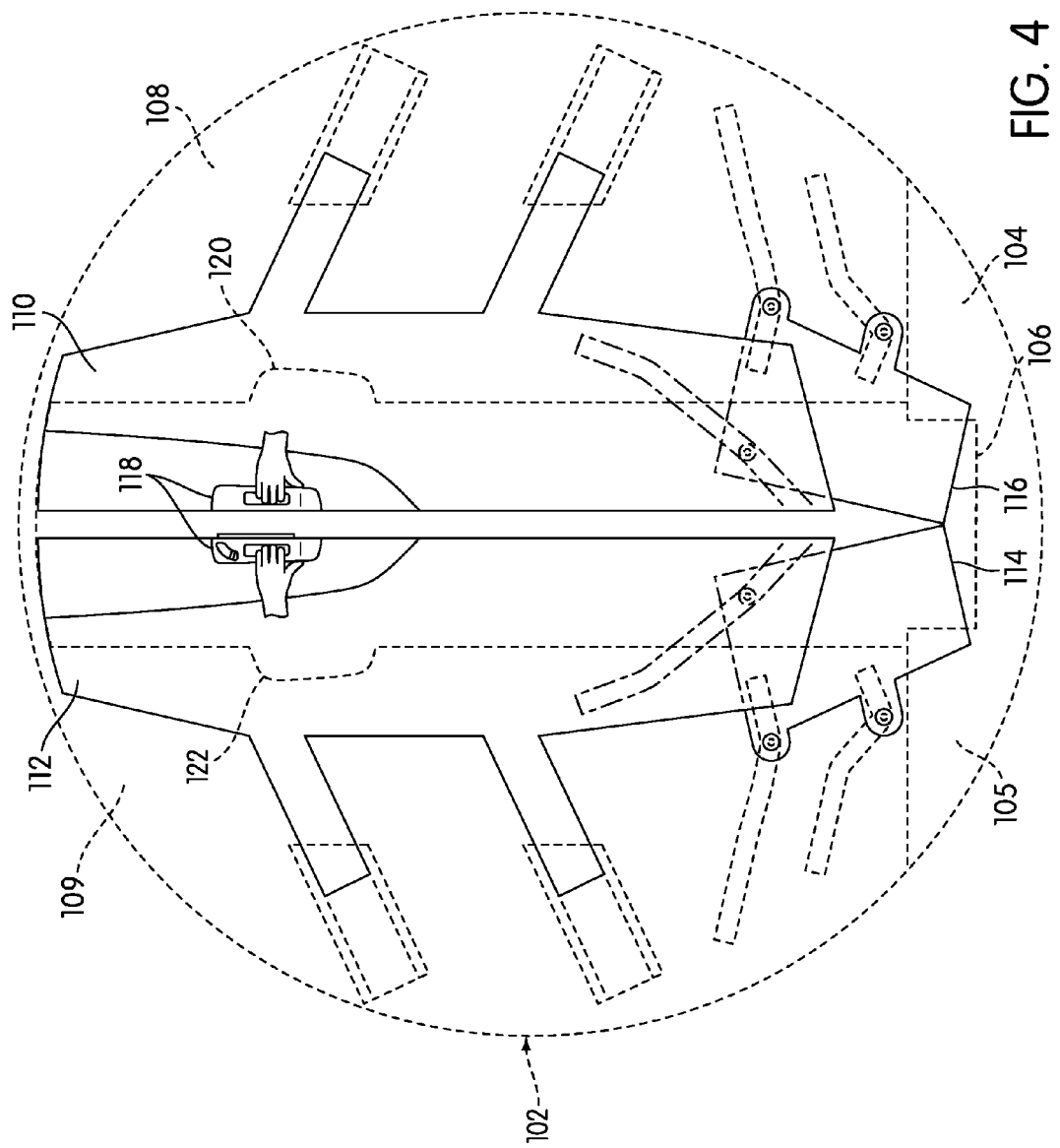
FIG. 4 is a schematic elevational view thereof with the panels near the beginning of the movement from an extended position to a retracted position.
Figure 5:
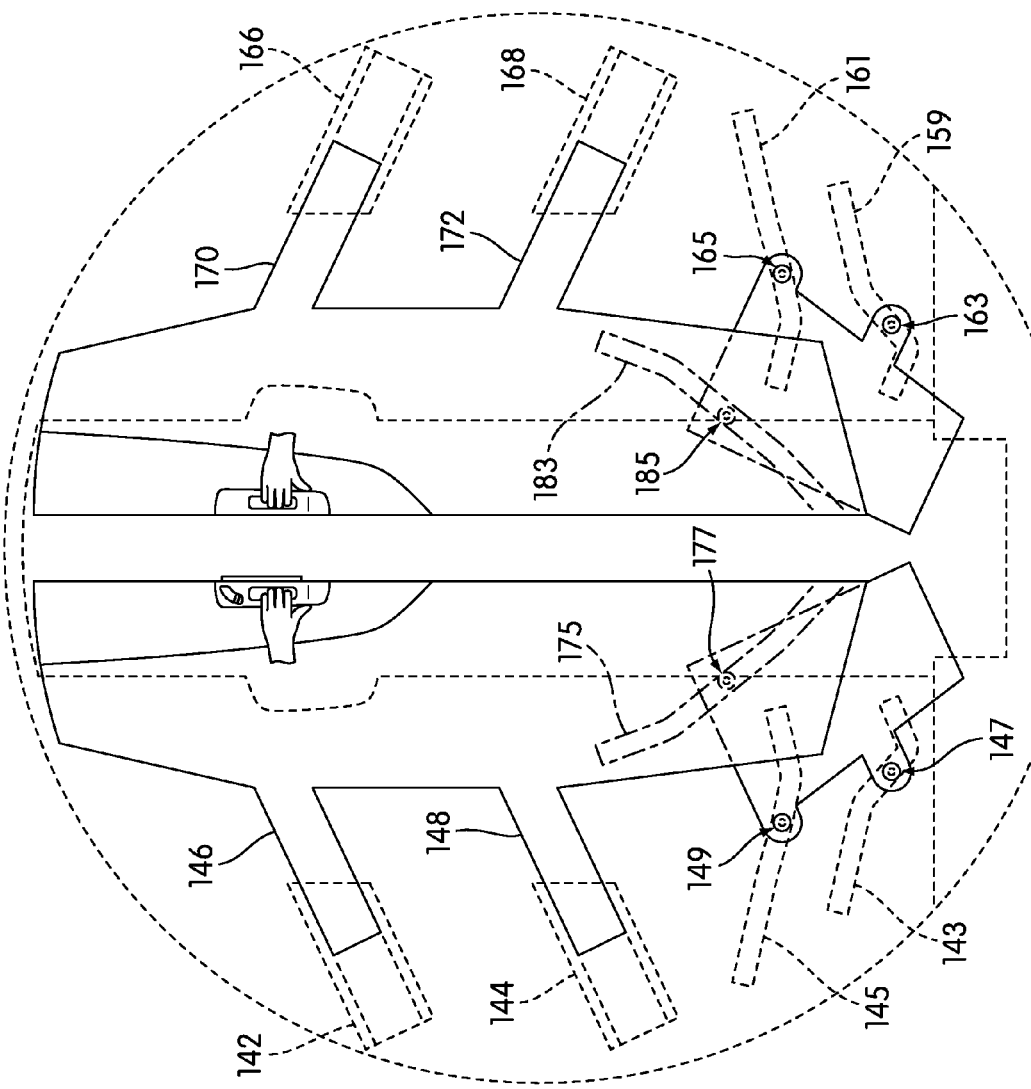
FIG. 5 is a schematic elevational view thereof with the panels continuing to move from an extended position to a retracted position.
Figure 6:
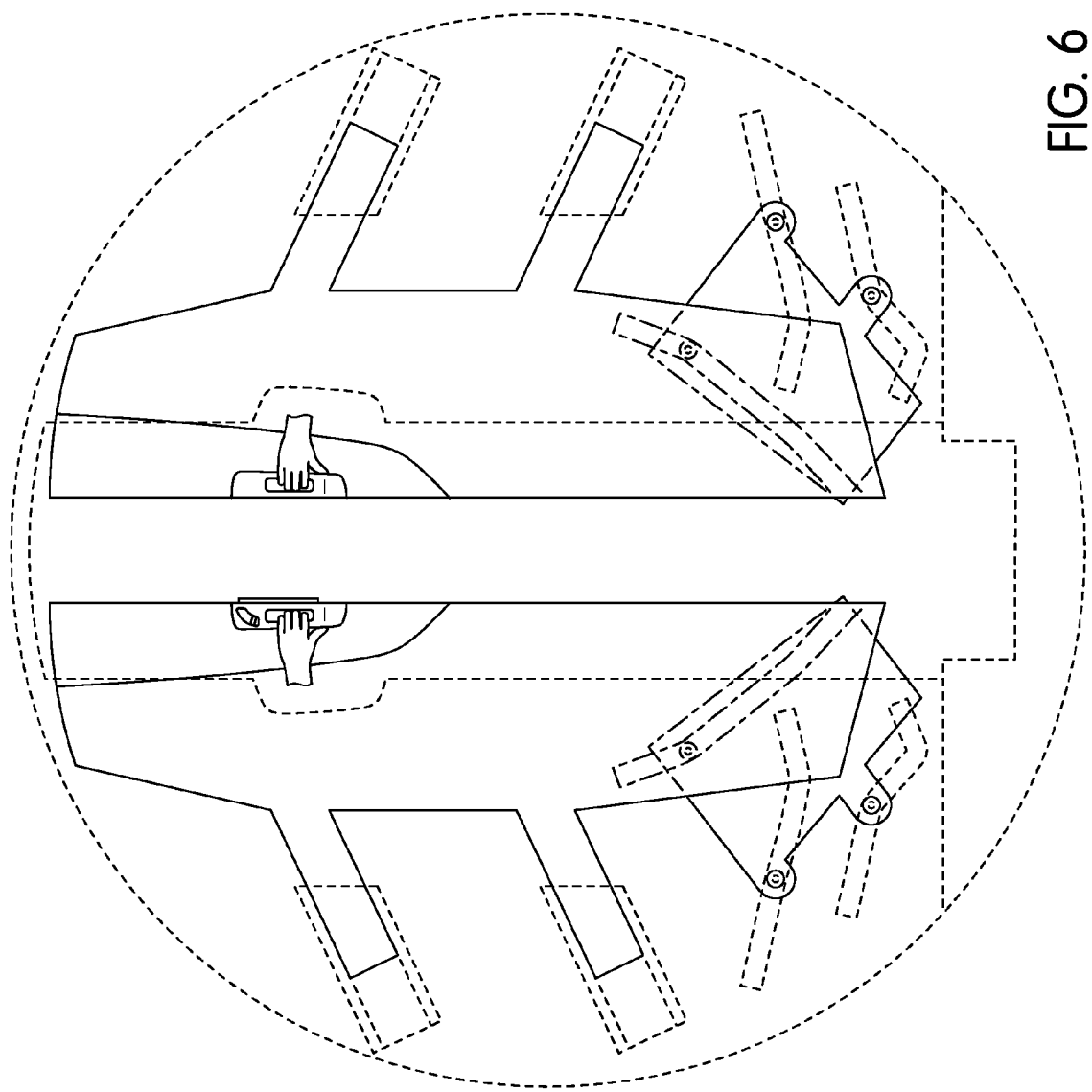
FIG. 6 is a schematic elevational view thereof with the panels continuing to move from an extended position to a retracted position.
Figure 7:
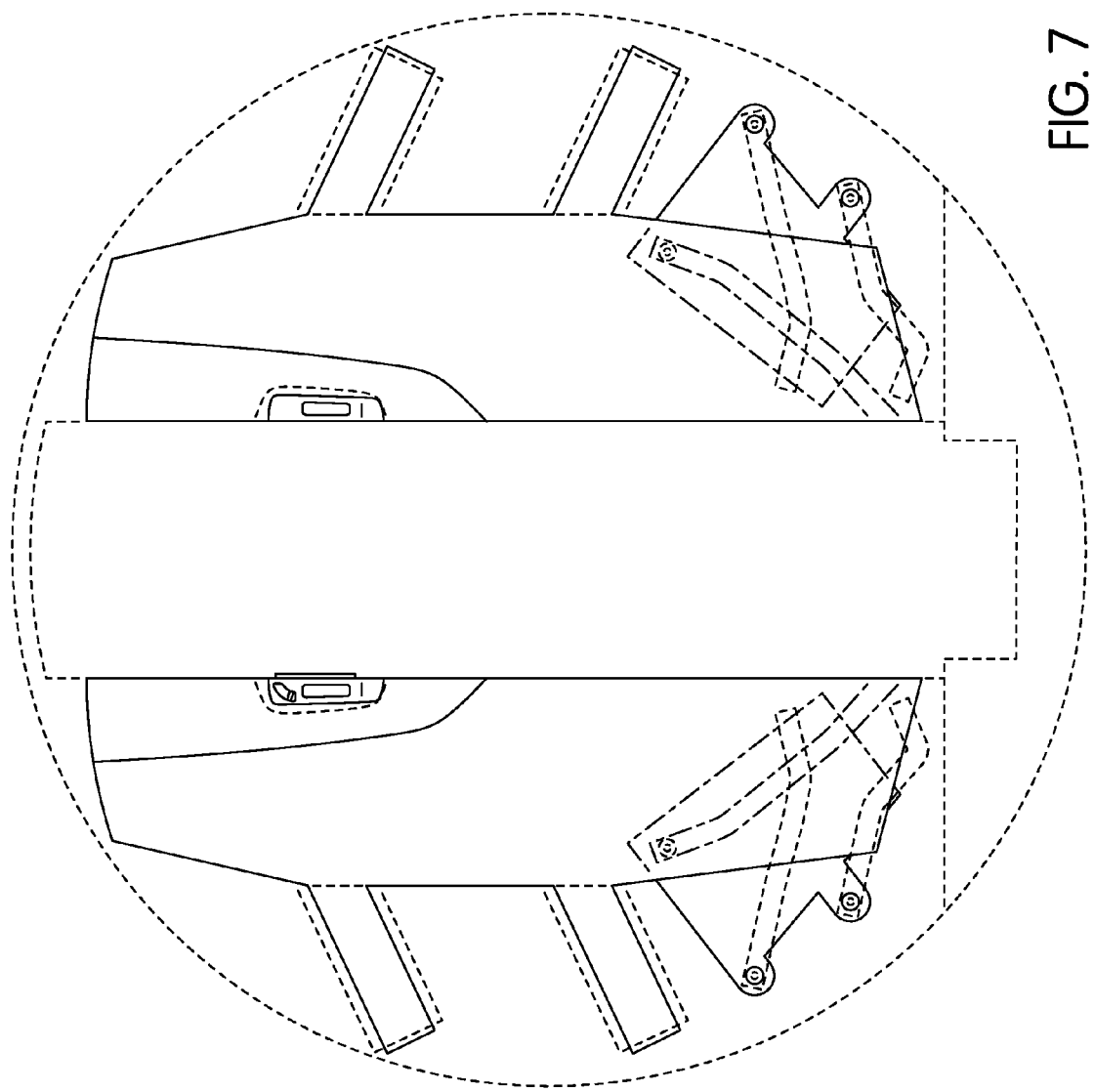
FIG. 7 is a schematic elevational view thereof completing the movement of panels from an extended position to a retracted position.
Figure 8:
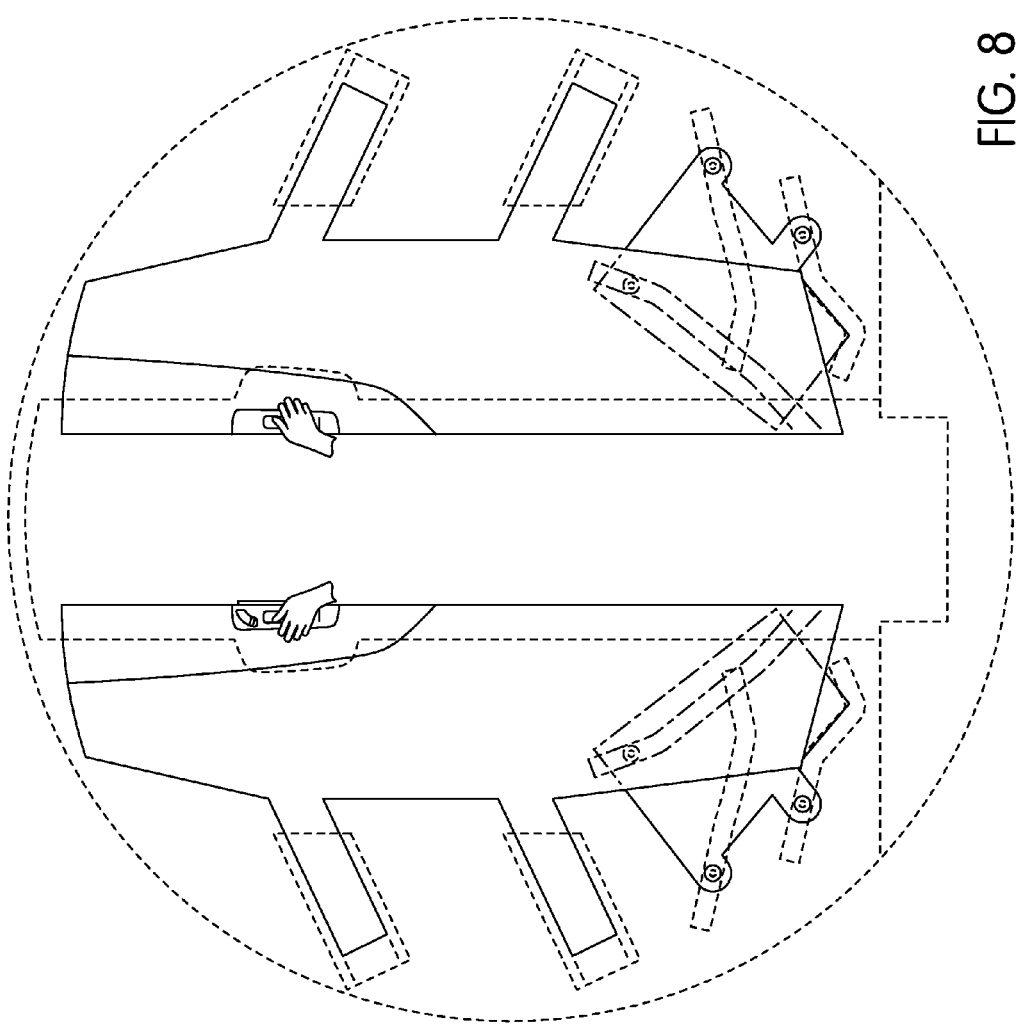
FIG. 8 is a schematic elevational view thereof showing the initial movement of the panels from a retracted position to an extended position.

The movement of paneled partition assembly 101 between the extended and retracted positions is illustrated in FIGS. 3-8. FIG. 3 is a schematic elevational view of the paneled partition assembly of FIG. 1 shown in both an extended and an unlocked position. FIG. 4 is a schematic elevational view thereof with the panels near the beginning of the movement from an extended position to a retracted position. FIG. 5 is a schematic elevational view thereof with the panels continuing to move from an extended position to a retracted position. FIG. 6 is a schematic elevational view thereof with the panels continuing to move from an extended position to a retracted position. FIG. 7 is a schematic elevational view thereof completing the movement of panels from an extended position to a retracted position. FIG. 8 is a schematic elevational view thereof showing the initial movement of the panels from a retracted position to an extended position.

Referring to FIGS. 3-8, airplane features including fuselage 102, aisle 106, and right and left seating area platforms 104, 105 are shown in dashed lines. The front wall portions 108, 109 and numerous tracks associated with paneled partition assembly 101 are also shown in dashed lines. Lock 118, driving panels 110 and 112, following panels 114 and 116, and associated track heads are shown in solid lines. The figures use both dashed and solid lines so that the features of paneled partition assembly 101 can be more easily seen.

In an exemplary embodiment shown in the figures, paneled partition assembly 101 includes four driving panels and a pair of following panels. The driving panels include front driving panel portions 110, 112 and corresponding rear driving panel portions. The rear driving panel portions are mirror images of front driving panel portions 110, 112. Follower panel portions 114, 116 are sandwiched between front driving panel portions 110,112 and the rear driving panel portions.

The driving and follower panels are guided between the extended and retracted positions by numerous tracks and track heads arranged on the cabin walls, driving panels, and follower panels. Attached to driving panel portion 110 are upper track head 170 and lower track head 172. Track heads 170, 172 are associated with upper track 166 and lower track 168 respectively. Upper track 166 and lower track 168 are positioned on front wall portion 108. Similarly, attached to driving panel portion 112 are upper track head 146 and lower track head 148. Track heads 146, 148 are associated with upper track 142 and lower track 144. Upper track 142 and lower track 144 are positioned on front wall portion 109. Corresponding rear driving panel portions and rear wall portions are similarly configured with a duplicate set of track heads and tracks.

Attached to following panel portion 116 are lower track head 163 and upper track head 165. Track heads 163, 165 are associated with lower track 159 and upper track 161 respectively. Lower track 159 and upper track 161 are positioned on front wall portion 108. Similarly, attached to following panel portion 114 are lower track head 147 and upper track head 149. Track heads 147, 149 are associated with lower track 143 and upper track 145. Lower track 143 and upper track 145 are positioned on front wall portion 109. The corresponding rear wall portions are similarly configured with a duplicate set of tracks. The rear side of following panel portions 114, 116 are similarly configured with a duplicate set of track heads.

Attached to following panel portion 116 is an additional connecting track head 185. Connecting track head 185 is associated with connecting track 183. Connecting track 183 is positioned on driving panel 110. Similarly, attached to following panel portion 114 is connecting track head 177. Connecting track head 177 is associated with connecting track 175. Connecting track 175 is positioned on driving panel 112. The corresponding rear driving panel portions are similarly configured with a duplicate set of tracks. The rear side of following panel portions 114,116 are similarly configured with a duplicate set of track heads.

FIGS. 3-7 illustrate the movement of paneled partition assembly 101 as it moves from the extended position to the retracted position. Referring to FIG. 3, once lock 118 is unlocked, a user may employ his left hand LH and right hand RH to push driving panel portions 110,112 diagonally downwards using left and right recessed handles 128, 130. Referring to FIGS. 3-7, the diagonal downward movement of driving panel portion 110 is guided by track heads 170, 172 and tracks 166, 168. In moving diagonally downward, track head first ends 174, 178 move from track first ends 182, 186 to track second ends 184, 188 respectively. In the retracted position, track first ends 182, 186 rest at or near track head second ends 176, 180. Similarly, track heads 146, 150 and tracks 142, 144 guide the movement of driving panel portion 112. In moving diagonally downward, track head first ends 150, 154 move from track first ends 158, 162 to track second ends 160, 164 respectively. In the retracted position, track first ends 158, 162 rest at or near track head second ends 152, 156. Corresponding rear driving panel portions move simultaneously with and in a similar manner as front driving panel portions 110, 112.

When driving panel portions 110, 112 reach the retracted position, first and second receiving edges 120, 122 accommodate sections of lock 118. First and second receiving edges 120, 122 are created by cutting regions of front wall portions 108, 109. The corresponding rear wall portions comprise similar receiving edges that receive the rear portions of lock 118.

The diagonal downward movement of the driving panels cause follower panels 114, 116 to move linearly and rotationally. The linear and rotational movement of following panel portion 116 is guided in part by track heads 163, 165 and tracks 159, 161. In moving from an extended position to a retracted position, track heads 163, 165 move from track first ends 167, 171 to track second ends 169, 173. Similarly, track heads 147, 149 and tracks 143, 145 guide, in part, the movement of follower panel 114. In moving from an extended position to a retracted position, track heads 147, 149 move from track first ends 151, 155 to track second ends 153, 157. The corresponding track heads on the rear side of follower panel portions 114, 116 move in a similar manner with respect to their corresponding tracks.

The linear and rotational movement of following panel portion 116 is also guided by connecting track head 185 and connecting track 183. In moving from an extended position to a retracted position, connecting track head 185 moves from connecting track first end 187 to connecting track second end 189. Similarly, connecting track head 177 and connecting track 175 also guide the movement of follower panel portion 114. In moving from an extended position to a retracted position, connecting track head 177 moves from connecting track first end 179 to connecting track second end 181. The corresponding track heads on the rear side of follower panel portions 114, 116 move in a similar manner with respect to their corresponding tracks.

In summary, the movement of driving panel portions 110, 112 cause connecting track heads 185, 177 to move. The movement of connecting track heads 185, 177 imparts a force on connecting tracks 183, 175 and ultimately following panel portions 116, 114. The force causes follower panel portions 114, 116 to move linearly and rotationally. The corresponding rear driving panel portions, rear track heads, and rear tracks function in a similar manner.

As shown in the figures, paneled partition assembly 101 may be pulled or pushed apart to the retracted position. In another embodiment, the single movement of unlocking lock 118 may cause paneled partition assembly 101 to automatically move to a retracted position. This may be accomplished by weighting the driving panels so that the force desired to move the following panel portions is applied solely by the weight of the driving panels.

FIG. 8 partially illustrates the movement of paneled partition assembly 101 as it moves from the retracted position to the extended position. The movement of paneled partition assembly 101 from the retracted position to the extended and unlocked position is accomplished through one motion provided by the user. Referring to FIG. 8, a user may employ his left hand LH and right hand RH to push driving panel portions 110, 112 diagonally upwards using left and right recessed handles 128, 130. The diagonally upward movement of the driving panels cause follower panels 114, 116 to move linearly and rotationally. The track heads of paneled partition assembly 101 follow the same path in moving from the extended position to the retracted position except in reverse. Once paneled partition assembly 101 is in the fully extended position, partition assembly 101 may be locked using lock 118.

Referring to FIGS. 2 and 9-14, portions of paneled partition assembly 101 are discussed in greater detail. In an embodiment, paneled partition assembly 101 may include a locking mechanism to prevent the panels from moving apart accidentally or unintentionally when paneled partition assembly 101 is in an extended position. The locking mechanism may be designed in a number of different ways to include sliding, rotating, or cammed locking. The locking mechanism may also be designed to lock specific panels together. For example, one or more driver panels may be locked to a follower panel.

In an exemplary embodiment shown in FIG. 2, lock 118 may be designed in two main portions, lock left portion 212 and lock right portion 214. Lock left portion 212 is disposed on the left half of paneled partition assembly 101 and lock right portion 214 is disposed on the right half of paneled partition assembly 101. Lock left portion 212 houses a locking feature, while lock right portion 214 receives a locking feature when the paneled partition assembly 101 is in the locked position. The configuration of lock 118 may be reversed so that lock right portion 214 houses a locking feature, while lock left portion 212 may receive a locking feature when the paneled partition assembly 101 is in the locked position.

Lock 118 comprises of left front lock cover 124 encasing front locking member 134 and right front lock cover 126. Only the front portions of lock covers 124, 126 are visible in this view due to the presence of panels 110 and 112.

Figure 9:
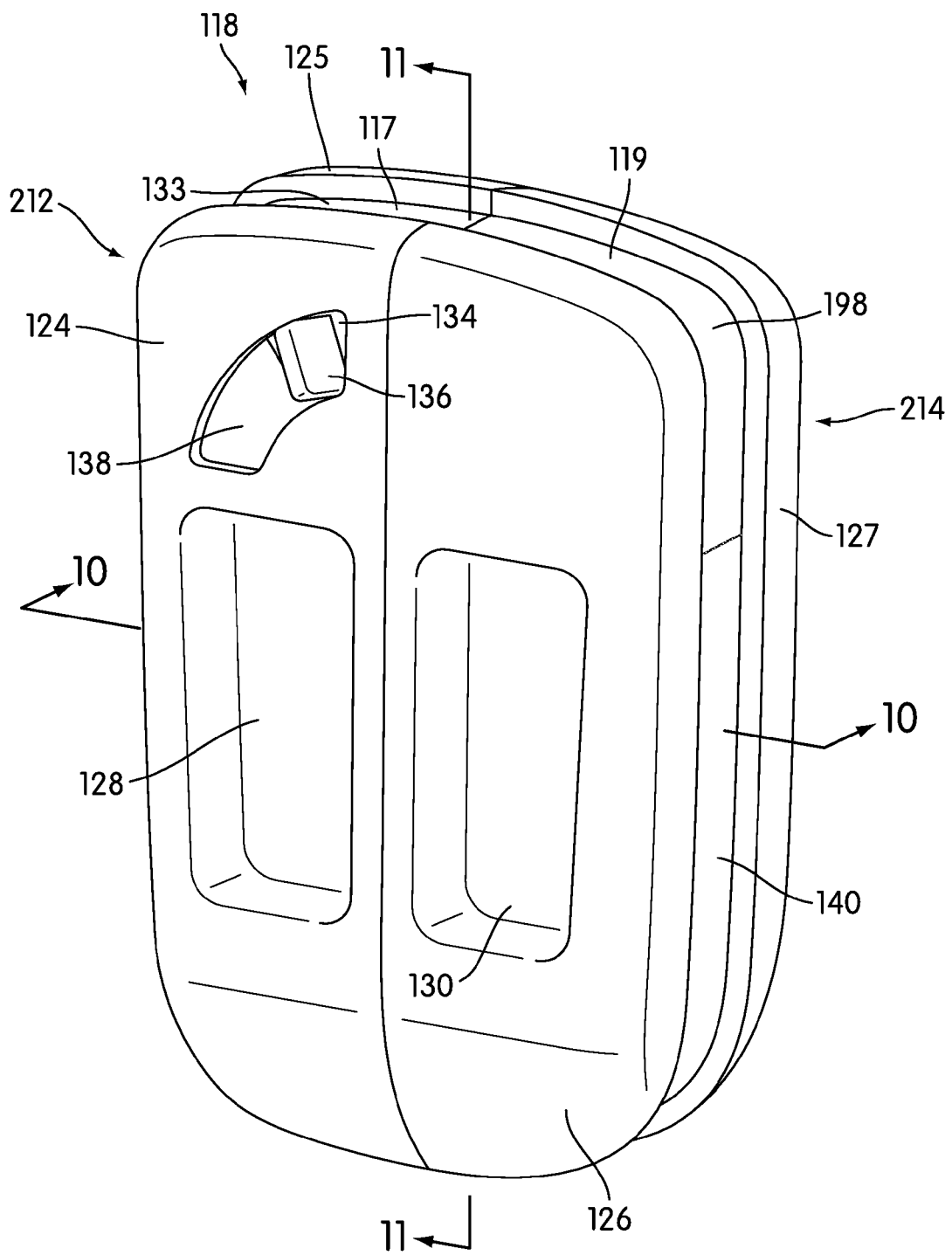
FIG. 9 is a schematic isometric view of the locking mechanism of FIG. 2 shown in isolation and in a locked position.

FIG. 9 is a schematic isometric view of the locking mechanism of FIG. 2 shown in isolation and in a locked position. Referring to FIG. 9, lock 118 is comprised of four covers: left front lock cover 124, right front lock cover 126, left rear lock cover 125, and right rear lock cover 127. Front lock cover 124 includes left lock cover extension 117. In an assembled position, lock cover extension 117 is disposed inside a void of rear lock cover 125. Lock cover extension 117 assists in creating left panel seat 133 between front lock cover 124 and rear lock cover 125 when the two cases are assembled. Left panel seat 133 appears as a groove or channel and receives driving panel portions 112, 115. Front lock cover 126, lock cover extension 119, and rear lock cover 127 are similarly configured to create right panel seat 198 to receive driving panel portion 110 and a corresponding rear driving panel.

In an embodiment, lock cover extensions 117, 119 extend around the top perimeter of lock 118. The perimeter of lock 118 below lock cover extensions 117, 119 is left open. Perimeter opening 140 allows driving panels to be received inside lock 118 for added structural support.

In different embodiments, the size, shape, and spacing of lock covers 124, 126, 125, and 127 may vary. The shape of lock covers 124, 126, 125, and 127 may be any shape that can contain the locking features, such as 129, 131, 134 and 135. In an embodiment shown in FIG. 9, the shape of lock 118 tapers slightly from the top portion, where the locking features are primarily located, to the bottom portion, where the handles are located. The size of and spacing between lock covers 124, 126, 125, and 127 may be any size and spacing that can contain the locking features and be able to seat and support the driving panels. In an embodiment shown in FIG. 9, the size and spacing of locking covers 124, 126, 125, and 127 are such that lock 118 minimally protrudes into the spaces in front of and behind partition assembly 101.

Handles may be located on paneled partition assembly 101 to more easily move paneled partition assembly 101 from the extended position to the retracted position and vice versa. In some embodiments, handles may be located on lock 118. The handles may be configured or designed as protrusions, recesses, or some combination of the two. For example, in an embodiment, the handles may be designed as c-shaped protrusions or like conventional door knobs. In the illustrated embodiment of FIG. 9, left and right handles 128, 130 are recessed handles. A recessed design is preferable in that the handles do not protrude into surrounding space any more than lock 118. Handles 128 and 130 may be any size and shape. Preferably, handles 128 and 130 are large enough for the average person's fingers to fit into or grasp the recesses.

To lock and unlock paneled partition assembly 101, a tab or knob may be grasped by a user. In the exemplary embodiment shown in the figures, locking tab 136 may protrude through locking slot 132 on front lock cover 124. The tab may be of any shape or size. However, the tab should be large enough for an individual to grasp. The tab should be positioned on front locking member 134 so that locking member 134 may be moved from the locked to the unlocked position with little interference from front lock cover 124.

The exterior face of front lock cover 124 is a mirror image of the exterior face of rear lock cover 125. In other words, rear lock cover 125 also includes a recessed handle, a locking tab, and a locking slot. The exterior face of front lock cover 126 is a mirror image of the exterior face of rear lock cover 127. In other words rear lock cover 127 also includes a recessed handle.

When lock 118 is in a locked position, indicator portion 138 is visible. Indicator portion 138 is a strip of material that indicates when lock 118 is locked. To make indicator portion 138 more visible, it may be colored or printed with a message, such as "locked." Preferably, indicator portion 138 is a red color. However, indicator portion 138 may be any color and include any message.

Figure 10:
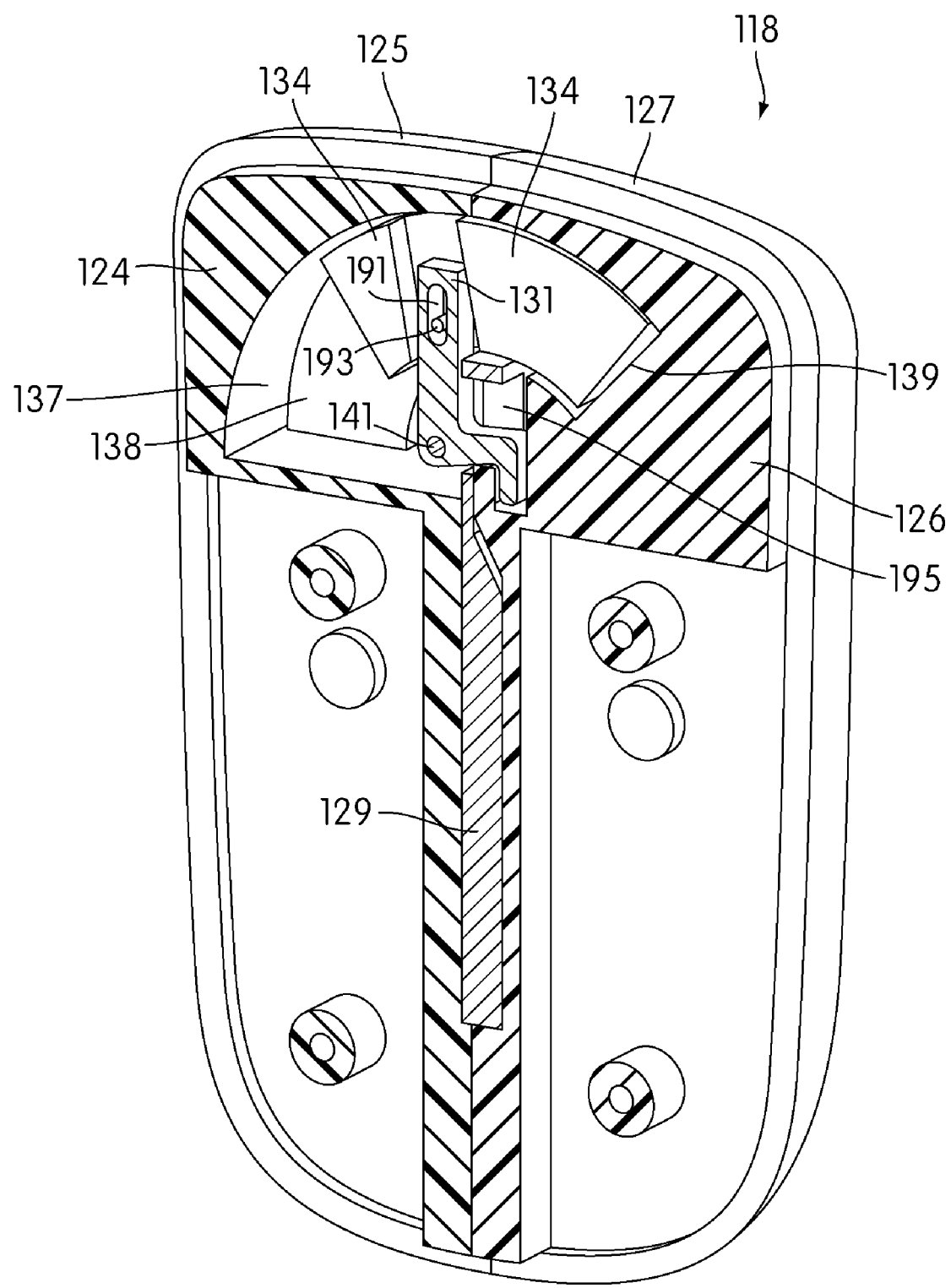
FIG. 10 is a schematic cross-sectional view of the locking mechanism taken along line 10-10 in FIG. 9.
Figure 11:
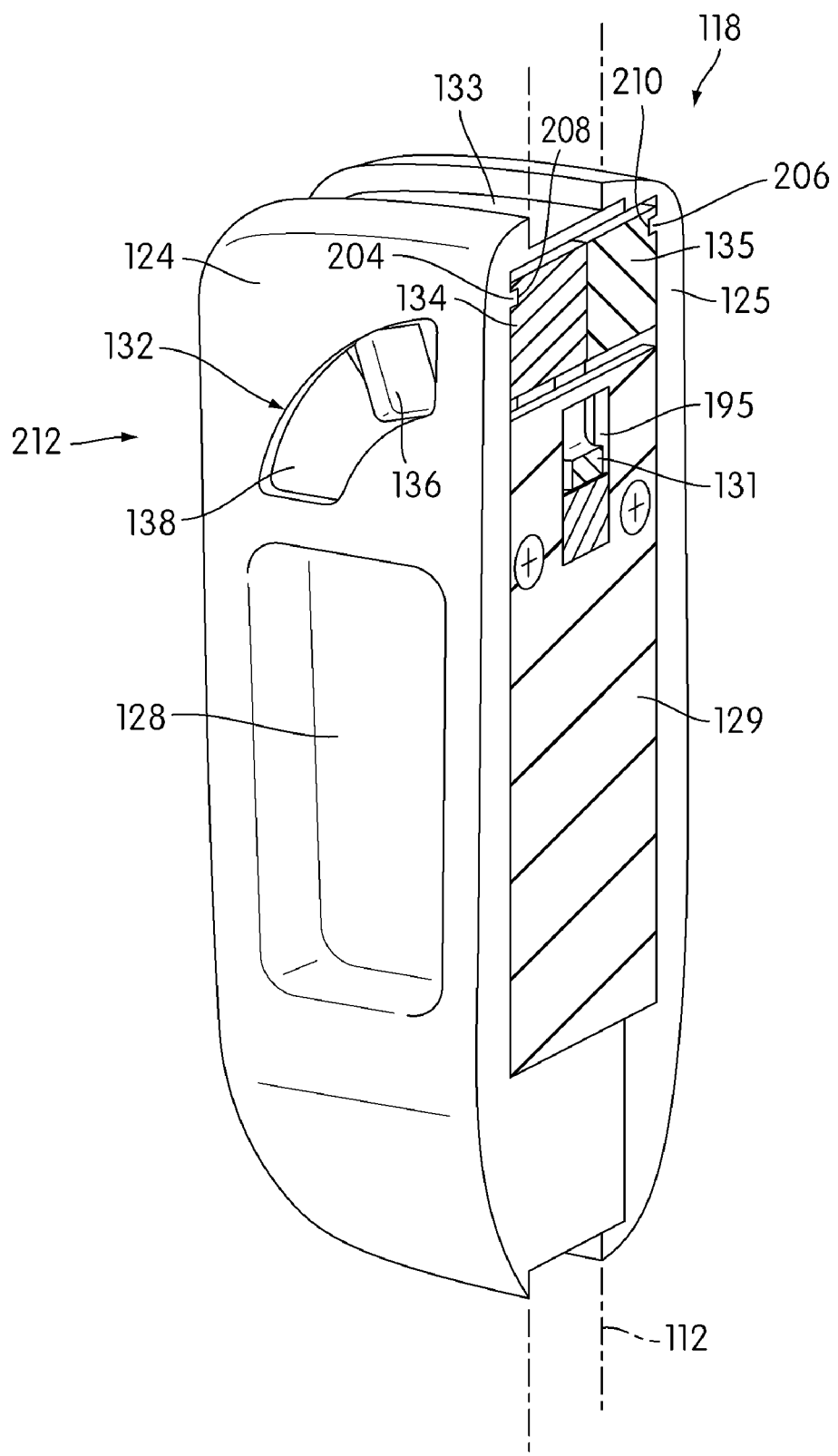
FIG. 11 is a schematic cross-sectional view of the locking mechanism taken along line 11-11 in FIG. 9.

FIG. 10 is a schematic cross-sectional view of the locking mechanism taken along line 10-10 in FIG. 9. FIG. 11 is a schematic cross-sectional view of the locking mechanism taken along line 11-11 in FIG. 9. Referring to FIGS. 10 and 11, the majority of the locking features reside inside the lock covers. The locking features include locking tab 136, front locking member 134, rear locking member 135, and central locking member 131. Locking tab 136 is connected to front locking member 134. Similarly, a corresponding locking tab on the rear side of lock 118 is connected to rear locking member 134. Front locking member 134 and rear locking member 135 may be positioned on front and rear guide rails 204, 206 respectively. Front and rear guide rails 204, 205 rest in front and rear locking member grooves 208, 210 respectively. Front and rear guide rails 204, 205 limit the motion of front and rear locking members 134, 135 respectively.

Between front locking member 134 and rear locking member 135 is disposed middle locking member 131. Middle locking member 131 is attached to front and rear locking members 134, 135 by guiding member 193. Guiding member 193 protrudes through guide slot 191 located on middle locking member 131. Middle locking member 131 also includes a hinge element that runs through the thickness of middle locking member 131.

Central lock plate 129 is attached to lock left portion 212 and provides additional structural stability to lock 118. A portion of central lock plate 129 extends beyond the boundary of lock left portion 212 toward lock right portion 214. Central lock plate 129 includes central lock plate aperture 195 that is disposed within central lock plate recess 216.

Rear lock cover 127 comprises receiving portion 218 that protrudes towards lock left portion 212. When paneled partition assembly 101 is in the closed position, receiving portion 218 is disposed within central lock plate recess 216 and below central lock plate aperture 195.

In a locked position, front locking member 134 and rear locking member 135 primarily reside within cavity 139 on lock right portion 214. The lower portion or hook portion of middle locking member 131 also extends toward lock right portion 214 and holds receiving latch 218 against central lock plate 129.

In moving from the locked position to the unlocked position, locking tab 136 may be moved from locking slot first end 121 to locking slot second end 123. Moving locking tab 136 also moves front locking member 134, central locking member 131, and rear locking member 135 into locking member recess 137 because these components are in movable communication with each other through guiding slot 191 and guiding member 193. When central locking member 131 is moved into locking member recess 137, central locking member 131 rotates about hinge member 141. Guiding slot 191 and guiding member 193 allow front and rear locking members 134, 135 to move with central locking member 131.

Figure 12:
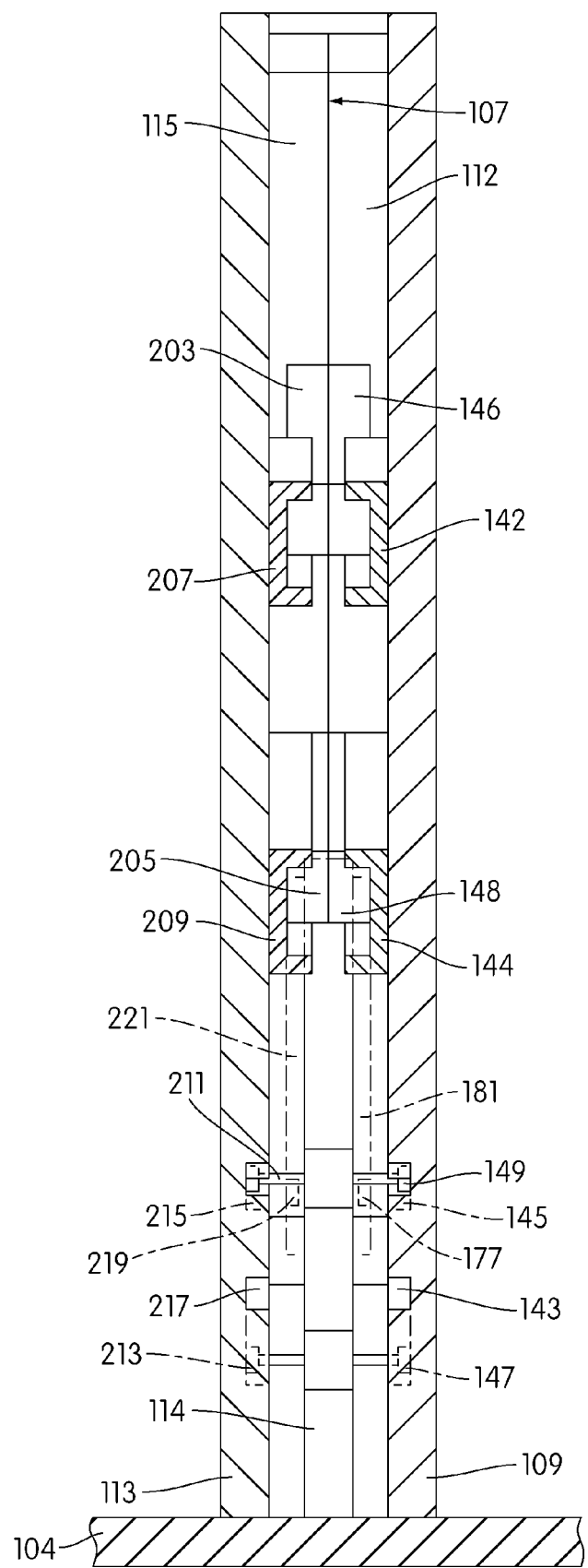
FIG. 12 is a schematic cross-sectional view of the paneled partition assembly taken along line 12-12 in FIG. 3.

FIG. 12 is a schematic cross-sectional view of the paneled partition assembly taken along line 12-12 in FIG. 3. Referring to FIG. 12, front driving panel 112, rear driving panel 115, and follower panel 114 are sandwiched between front and rear wall portions 109, 113 within recess 107. Front driving panel 112 includes associated driving track heads 146, 148. Driving tracks 142, 144 are associated with wall portion 109. A segment of driving track heads 146, 148 reside in driving tracks 142, 144 respectively. Similarly, rear driving panel 115 and rear wall portion 113 include corresponding driving track heads 203, 205 and driving tracks 207, 209. Additionally, driving panels 112, 115 have thinner or recessed lower portions that accommodate follower panel 114.

Follower panel 114 is comprised of associated upper and lower arms 220, 222. Upper and lower arms 220, 222 include front facing track heads 149, 147 respectively. Track heads 149, 147 move through tracks 145, 143 that are recessed within wall portion 109. Upper and lower arms 220, 222 include rear facing track heads 211, 213 respectively. Track heads 211, 213 move through tracks 215, 217 that are recessed within wall portion 113.

Follower panel 114 also includes front facing connecting track head 177 and rear facing connecting track head 219. Connecting track head 177 moves through connecting track 175. Connecting track 175 is designed as a recess within the lower portion of driving panel 112. Connecting track head 219, connecting track 221, and rear wall portion 113 are similarly configured.

The configurations of the panels, tracks, track heads, and cabin walls illustrated in FIG. 12 and showing a left portion of paneled partition assembly 101. This left portion is mirrored on the right portion of paneled partition assembly 101. Therefore, the left portion and right portion operates in a similar manner.

Ideally, paneled partition assembly 101 actuates smoothly from an extended position to a retracted position and vice versa. In addition, the retracted position is a more compact configuration than the extended position. To achieve a smooth actuation and compact retracted position, paneled partition assembly 101 may include a number of features.

Figure 13:
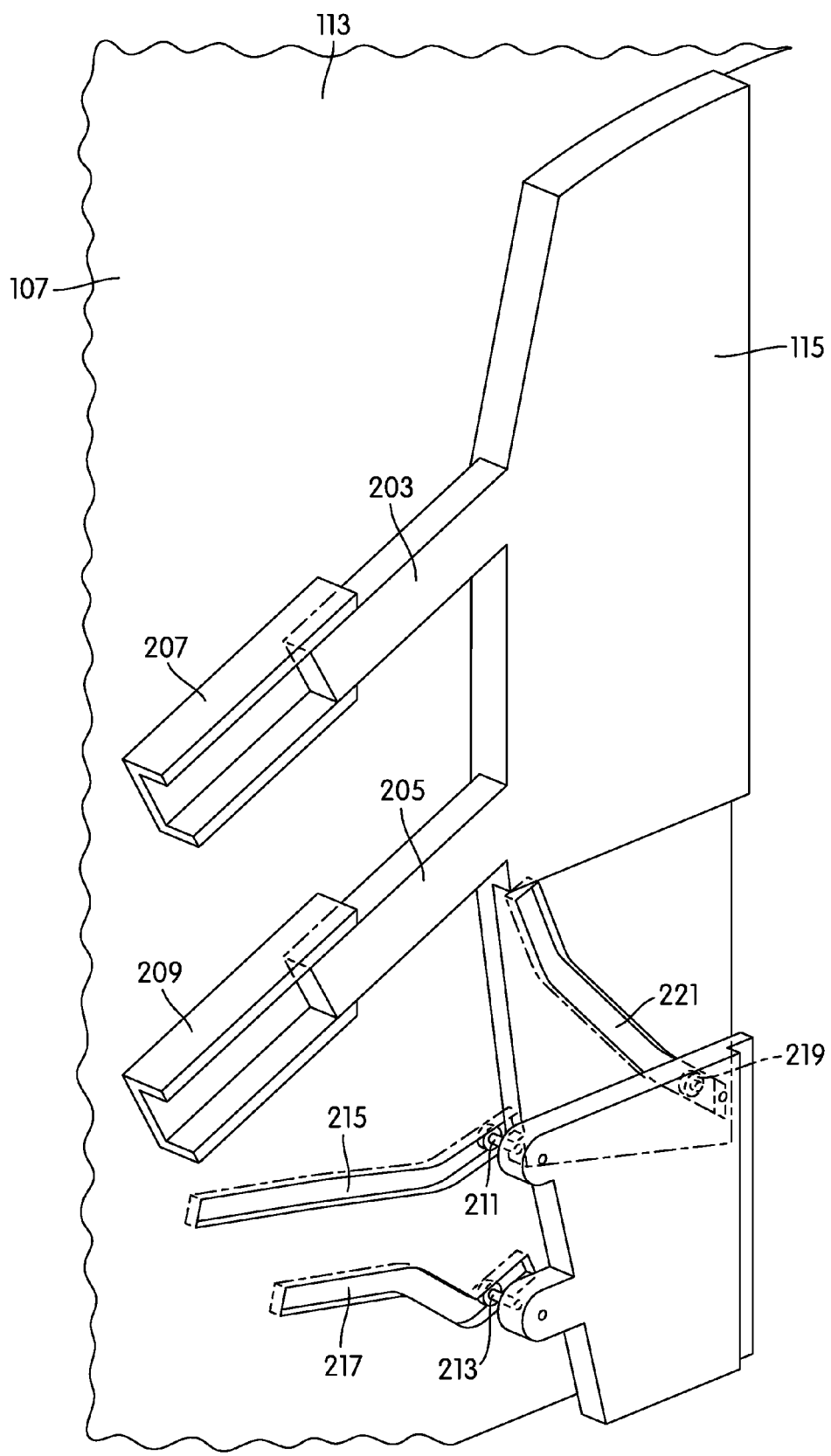
FIG. 13 is a schematic isometric view of a left rear driving panel, left follower panel, and associated tracks and track heads.

FIG. 13 is a schematic isometric view of a left rear driving panel, left follower panel, and associated tracks and track heads. The front facing track heads and their corresponding tracks are omitted from the figure in order to clearly show the remaining parts. Referring to FIG. 13, the shape, size, and spacing of driving panel 115 and follower panel 114 may vary in different embodiments. The shape and size of driving panel 115 and follower panel 114 may be any shape or size required to cover some or all portions of an opening. The spacing of driving panel portion 115 and follower panel 114 from each other and other parts of paneled partition assembly 101 is such that the resulting structure can support the weight of the numerous panels and mechanisms. Preferably, all parts are sandwiched together with only enough space to allow for movement of the assembly.

The shape, size, and spacing of the remaining driving panels and follower panel may vary similarly. Additionally, the number of driving panels may vary in different embodiments. In the exemplary embodiment shown in the drawings, four driving panels are utilized. However, in another embodiment driving panel portions, such as 112 and 115, may be merged into one driving panel. The corresponding driving panels on the right part of paneled partition assembly 101 may also be merged. The resulting partition assembly only comprises two driving panel portions.

In another embodiment, only one driving panel and one following panel are used. In other words, only half of the panels illustrated in the figures are use to cover an opening. In this embodiment, lock 118 may lock a panel to a wall or the panels to each other.

The shape, size, and orientation of the assorted track heads and tracks used in paneled partition assembly 101 may vary in different embodiments. The shape and size of the track heads and tracks may be any shape or size that can structurally support the panels. However, the shape and size of each track and track head should correspond to each other so that they are movably engaged. In an exemplary embodiment shown in the figures, track heads 203, 205 positioned on driving panel 115 are bars with rectangular cross-sections. Corresponding tracks 207, 209 are c-shaped to receive and engage track heads 203, 205.

In another exemplary embodiment shown in the figures, track heads 211, 213 positioned on following panel 114 are designed in a disk and stem configuration. The disk portions of track heads 211, 213 movably engage tracks 215, 217. Tracks 215, 217 are designed as recesses on rear wall portion 113 that are rectangular in cross-section. Connecting track head 219 and connecting track 221 are similarly designed. However, connecting track 221 is designed as a rectangular recess on driving panel portion 115. In one embodiment, the track and track heads may be telescoping rods. In another embodiment, the c-shaped track may be a curved-c rather than a block-c. In an additional embodiment, a c-shaped track may reside inside a recess located within a wall portion or panel to provide additional structural support for the assembly.

The shapes and sizes of the tracks and track heads are numerous. As illustrated in the figures, the shapes and sizes may even vary within one embodiment of paneled partition assembly 101. However, it is important to note that the tracks associated with the follower panels and the wall portions are generally recessed so that the tracks do not interfere with the motion of the driving panels.

The design of the track heads and the tracks may also vary in shape and orientation depending on the path the panels are to follow. The path may be driven by the available space in a wall and the size of the opening. In the exemplary embodiment, the driving panels move diagonally and the following panels move diagonally and rotationally. In another embodiment, the driving panels may move more horizontally or more vertically. In yet another embodiment, the following panels may move more horizontally, more vertically, in a larger arc, smaller arc, or some combination thereof.

Figure 14:
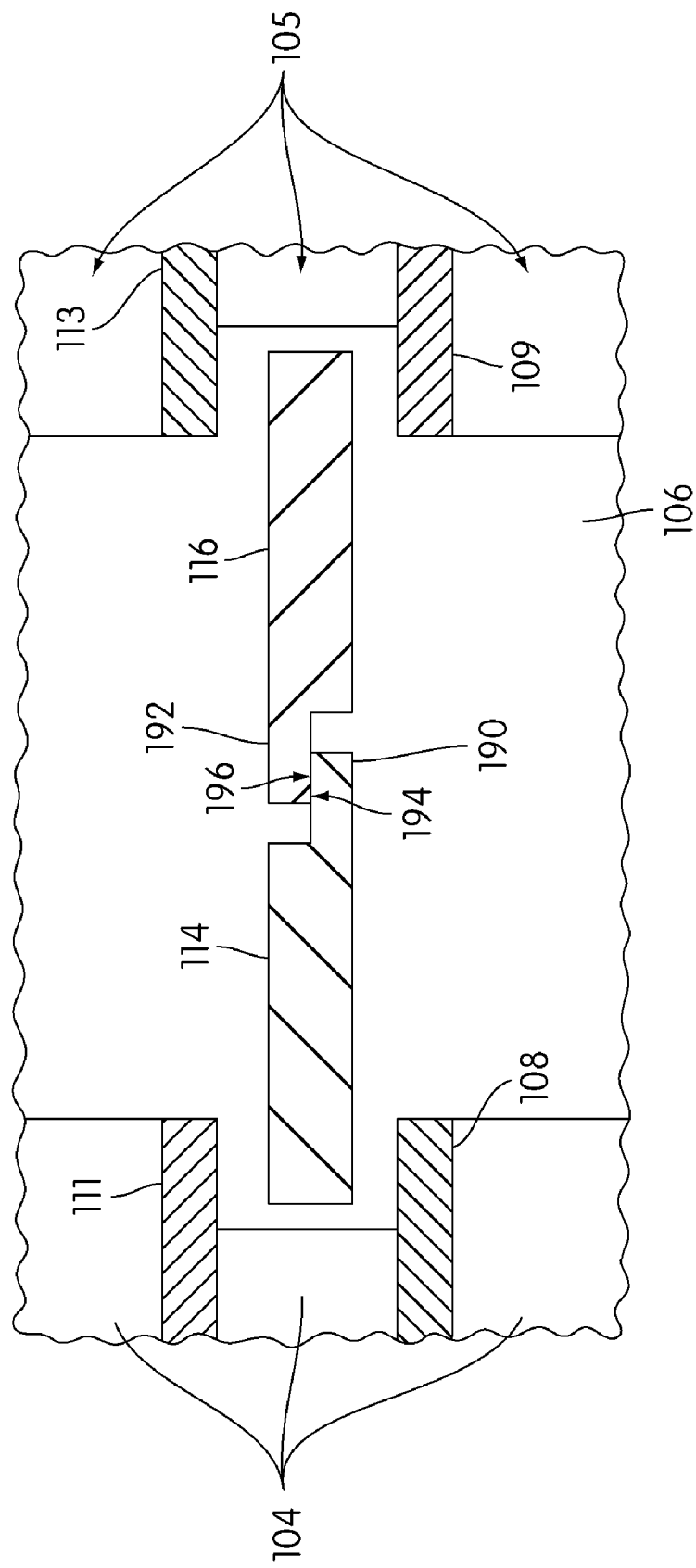
FIG. 14 is a schematic cross-sectional view of the paneled partition left and right follower panels taken along line 14-14 in FIG. 1.

FIG. 14 is a schematic cross-sectional view of the paneled partition left and right follower panels taken along line 14-14 in FIG. 1. Referring to FIG. 14, follower panels 114, 116 include left and right flanges 190, 192 respectively. As illustrated in FIG. 14, when paneled partition assembly 101 is in an extended position, left flange surface 194 and right flange surface 196 are in contact. When paneled partition assembly 101 is in an extended position and viewed from the adjacent spaces, the panels cover the entire opening.

Left and right flanges 190, 192 are designed such that when follower panels 114, 116 are moved from the extended position to the retracted position, follower panels 114, 116 do not collide. The design accommodates the rotational motion of follower panels 114, 116, while covering the entire opening between adjacent spaces.

In different embodiments, the size and shape of left follower panel flange 190 and right follower panel flange 192 may vary. The shape of left and right follower panel flanges 190 and 192 may be any shape that allows the opening between spaces to be covered entirely. For example, the flanges may be triangular or rectangular in shape. In an exemplary embodiment shown in FIG. 14, the flanges are rectangular in shape. The size of left and right follower panel flanges 190 and 192 may be any size that allows the opening between spaces to be fully covered while allowing the panels to rotate freely. The length of each flange is minimized to reduce interference between the flange and the positions of the connecting tracking heads 177, 185, 222, and 224.

Additionally, FIG. 14 shows platforms 104 and 105 extending past the cabin walls and into the compartment at the rear of the paneled partition assembly 101. To accommodate for portions of the platform that may interfere with the movement of the paneled partition assembly, platforms 104 and 105 are shown recessed in the area between the cabin walls. In other embodiments, platforms 104 and 105 may not exist between or past cabin walls 108 and 109. In yet other embodiments, a recess may not be required because the lower panels rotate in such a way as to clear the platform entirely.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A partition assembly adapted to selectively separate a first space from a second space, said assembly comprising:
   a wall portion defining an opening;
   a plurality of panels arranged in communication with said wall portion and each other to selectively cover said opening when said plurality of panels are in a fully extended position and to uncover said opening when said plurality of panels are in a retracted position;
   said plurality of panels comprising at least one driving panel and at least one following panel coupled such that movement of said at least one driving panel causes movement of said at least one said first following panel;

wherein said at least one driving panel moves linearly to cause said at least one following panel to move linearly and rotationally; and a track system comprising a first track positioned on said at least one driving panel and a first track head positioned on a first side of said at least one following panel, said first track head configured to move along said first track to cause said at least one following panel to move linearly and rotationally.

2. The partition assembly according to claim 1, wherein said at least one driving panel includes a front driving panel and a rear driving panel, said first track being positioned on said front driving panel and a second track being positioned on said rear driving panel, and wherein a second track head is positioned on a second side of said following panel opposite said first track head and is configured to move along said second track.

3. The partition assembly according to claim 2, further comprising:

a third track positioned on said wall portion and a third track head positioned on said front driving panel, said third track head configured to move along said third track to cause said front driving panel to move between said fully extended position and said retracted position; and a fourth track positioned on said wall portion and a fourth track head positioned on said rear driving panel, said fourth track head configured to move along said fourth track to cause said rear driving panel to move between said fully extended position and said retracted position.

4. The partition assembly according to claim 1, further comprising:

a locking mechanism configured to lock said at least one driving panel in said fully extended position.

5. The partition assembly according to claim 1, further comprising:

a second track positioned on said wall portion and a second track head positioned on said at least one following panel, said second track head configured to move along said second track to cause said at least one following panel to move between said fully extended position and said retracted position.

6. The partition assembly according to claim 1, further comprising:

a second track positioned on said wall portion and a second track head positioned on said at least driving panel, said second track head configured to move along said second track to cause said at least one driving panel to move linearly between said fully extended position and said retracted position.

7. The partition assembly according to claim 4, wherein the locking mechanism comprises a front locking member, a rear locking member, a middle locking member disposed between said front locking member and said rear locking member, and a guiding member attaching said front locking member, said middle locking member, and said rear locking member to cause said front locking member, said middle locking member, and said rear locking member to move together within a first locking member recess.

8. The partition assembly according to claim 7, wherein said first track head is configured to move along said first track to cause said at least one driving panel to move between said fully extended position and said retracted position.

9. The partition assembly according to claim 7, wherein the mechanism comprises a first front locking cover and a first rear locking cover, and wherein said first locking member recess is disposed within both said first front locking cover and said first rear locking cover, said front locking member, said middle locking member, and said rear locking member configured to be positioned in said first locking member recess when said locking mechanism is in an unlocked position.

10. The partition assembly according to claim 9, wherein the locking mechanism further comprises a second front locking cover, a second rear locking cover, and a second locking member recess disposed within both said second front locking cover and said second rear locking cover, said front locking member and said rear locking member configured to be positioned in said second locking member recess when said locking mechanism is in a locked position.

11. The partition assembly according to claim 7, wherein said middle locking member comprises a hook portion configured to prevent motion of said plurality of panels.

12. The partition assembly according to claim 7, wherein said locking mechanism further comprises handles to control movement of said plurality of panels.

13. An airplane fuselage partition assembly adapted to selectively separate a first cabin compartment from a second cabin compartment, said assembly comprising:

a cabin wall portion defining an opening;

a plurality of panels arranged in communication with said cabin wall portion and each other to selectively cover said opening when said plurality of panels are in a fully extended position and to uncover said opening when said plurality of panels are in a retracted position;

said plurality of panels comprising at least one driving panel and at least one following panel coupled such that movement of said at least one driving panel causes movement of said at least one following panel;

wherein said at least one driving panel moves linearly to cause said at least one following panel to move linearly and rotationally;

said at least one driving panel comprising a first front driving panel and a first rear driving panel, a first track being positioned on said first front driving panel, and a second track being positioned on said first rear driving panel;

said at least one following panel comprising a first track head configured to move along said first track to cause said at least one following panel to move linearly and rotationally, and a second track head configured to move along said second track to cause said at least one following panel to move linearly and rotationally; and a locking mechanism comprising a first front locking cover positioned on said first front driving panel, a first rear locking cover positioned on said first rear driving panel, a first locking member recess disposed within both said first front locking cover and said first rear locking cover, and at least one locking member configured to be positioned in said first locking member recess.

14. The airplane fuselage partition assembly according to claim 13, wherein said locking member comprises a front locking member, a rear locking member, a middle locking member disposed between said front locking member and said rear locking member, and a guiding member attaching said front locking member, said middle locking member, and said rear locking member to cause said front locking member, said middle locking member, and said rear locking member to move together.

15. The airplane fuselage partition assembly according to claim 14, wherein said middle locking member comprises a hook portion configured to prevent motion of said plurality of panels.

16. The airplane fuselage partition assembly of claim 13, further comprising:
- a third track positioned on said wall portion and a third track head positioned on said first front driving panel, said third track head configured to move along said third track to cause said first front driving panel to move between said fully extended position and said retracted position; and
- a fourth track positioned on said wall portion and a fourth track head positioned on said first rear driving panel, said fourth track head configured to move along said fourth track to cause said first rear driving panel to move between said fully extended position and said retracted position.

17. The airplane fuselage partition assembly according to claim 13, further comprising:
- a third track positioned on said wall portion and a third track head positioned on said at least one following panel, said third track head configured to move along said third track; and
- a fourth track positioned on said wall portion and a fourth track head positioned on said at least one following panel, said fourth track head configured to move along said fourth track.

18. The airplane fuselage partition assembly according to claim 15, wherein said at least one driving panel comprises a second front driving panel and a second rear driving panel, and wherein said locking mechanism comprises a second front locking cover positioned on said second front driving panel, a second rear locking cover positioned on said second rear driving panel, at least one of said second front locking cover and said second rear locking cover having a receiving portion configured to receive said hook portion to prevent motion of said plurality of panels.

\* \* \* \* \*